Figure 1:
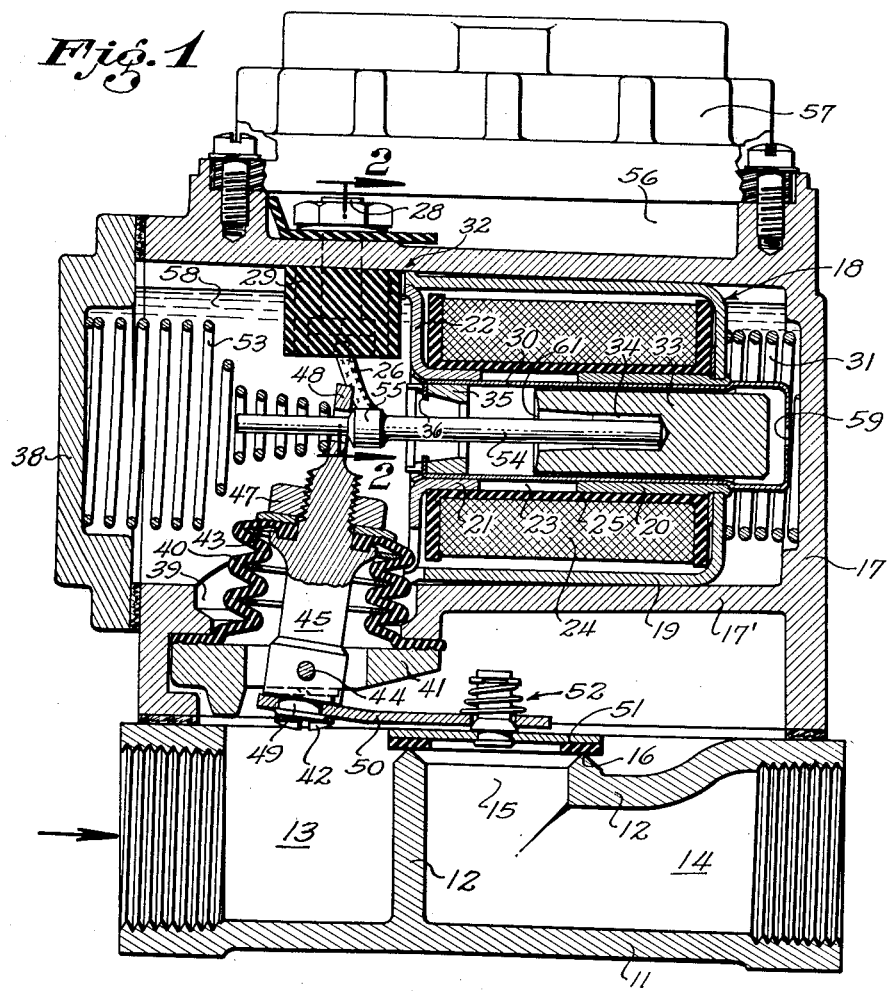

Feb. 2, 1960

W. A. RAY 2,923,520

HUM-FREE SOLENOID MECHANISM

Filed Sept. 24, 1956

WILLIAM A. RAY, Inventor,

By John H. Rouse, Attorney

United States Patent Office 2,923,520
Patented Feb. 2, 1960

2,923,520

HUM-FREE SOLENOID MECHANISM

William A. Ray, North Hollywood, Calif., assignor to General Controls Co., Glendale, Calif., a corporation of California Application September 24, 1956, Serial No. 611,543

17 Claims. (Cl. 251—54)

This invention relates to electromagnetic devices for operating valves, switching mechanisms and other control devices, and more particularly to solenoid operators and solenoid valves energizable by the current supplied by the ordinary alternating-current service. The present invention is, in some respects, an improvement on the invention disclosed in my copending application Serial No. 594,280 filed June 27, 1956, now abandoned, and in a continuation-in-part thereof Serial No. 672,688, filed July 18, 1957.

It is a general object of this invention to provide an A.C. solenoid operator which is hum-free, consumes a relatively small amount of current, and is highly effective and reliable.

In the aforementioned application Serial No. 672,688 I disclosed the use, in a solenoid operator, of liquid of such high viscosity that it acts as a "fluid glue" or adhesive agent in the clearance space between the cooperating surfaces of the solenoid plunger and its guide and retards operative movements of the plunger; the viscous liquid, by its adhesive action, also preventing appreciable vibration of the plunger when the solenoid is energized by alternating current.

It is an object of the present invention to provide an A.C. solenoid operator, employing viscous liquid, which is arranged so that the liquid, while effective to prevent appreciable A.C. vibration of the plunger, does not necessarily retard the operative movements of the plunger significantly. I accomplish this object by providing stop means having a surface engageable by a surface of the plunger at the end of its attracted stroke, between which surfaces the liquid acts in its adhesive capacity.

Another object of the invention is to improve the efficiency of the solenoid operator described in the preceding paragraph by constructing the stop means of magnetic material and arranging it so that it supplements the magnetic circuit of the operator.

Another object is to construct and arrange the stop means so that it does not produce significant eddy-current losses, which would impair the efficiency of the operator.

Another object is to provide an A.C. solenoid operator which has particular utility in connection with the operation of a fluid control valve.

For full understanding of the invention, and further appreciation of its objects and advantages, reference is to be had to the following detailed description and accompanying drawing, and to the appended claims.

Figure 2:
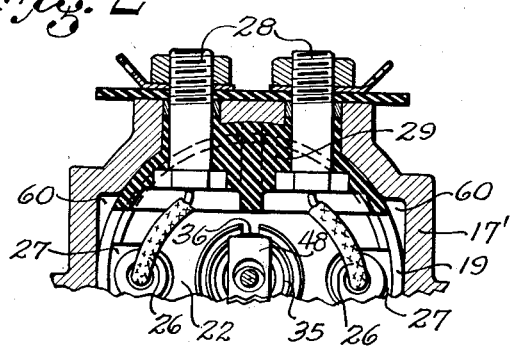

In the drawing:

Figure 1 is a sectional view of a solenoid valve structure embodying this invention; and Figure 2 is a fragmentary section taken along the line 2—2 of Fig. 1.

In the drawing the numeral 11 indicates a valve casing having a passage therethrough which is divided by an angled partition 12 to form an inlet chamber 13 and an outlet chamber 14, the horizontal portion of the partition having a port 15 around whose inlet end is an annular valve-seat 16.

Mounted on the valve casing, so as to enclose the open top thereof, is a hollow body 17 having at its right-hand end means, including walls 17', forming a generally cylindrical socket for a solenoid device or electromagnet generally indicated at 18, the solenoid device and the socket being tapered conformingly and so that when the device is seated there is a space between its right-hand end and the adjacent side wall of the body.

The solenoid device 18 has a magnetic frame comprising a cup-shaped outer shell 19, a tubular member 20 inside the shell and rigidly secured at its outer end in a central opening through the end wall of the shell, and another tubular member 21 inside the shell in alignment with member 20 and having at its outer end a flange portion 22 fitting the mouth of the shell and secured thereto as by welding. The inner ends of the tubular members 20, 21 are spaced apart to provide a magnetic air-gap 23. In the annular space between shell 19 and members 20, 21 is an energizing coil 24 wound on a bobbin 25 and having leads 26 which extend through openings 27 (Fig. 2) in the shell-flange 22 to a pair of sub-terminals 28 mounted in an insulating block 29 and projecting sealingly through openings in the top of body-portion 17'.

Fitting snugly inside the tubular frame-members 20, 21 is a cylindrical guide-tube 30, of thin nonmagnetic material, whose cup-like right-hand end portion (outside member 20) is enlarged, and its left-hand extremity flared around, and soldered to, the mouth of member 21 to hold the guide tube securely in place. A spring 31, compressed between the right-hand end of the solenoid device and the adjacent side wall of the body, serves to maintain the left top edge of the device in abutment with the insulating block 29, there being a rib and notch arrangement indicated at 32 for orienting the device about its axis. Freely reciprocable inside the guide tube 30 is a cylindrical armature or magnetic plunger 33 having a deep axial recess 34, and in the mouth of the guide tube is an annular stop member 35 which is secured in place as by welding and/or by bent-over fingers 36 cut from the flared rim of the guide tube.

In the left-hand wall of body 17 is a large opening closed by a cap 38, and in the curved lower portion 17' of the body, at its left, is an opening 39 leading to the inlet chamber 13 of the valve casing and closed by a flexible bellows 40, of material such as synthetic rubber, whose bottom flange is clamped to the body around opening 39 by an annular member 41 fastened by screws 42, there being stiffening ribs or rings 43 in the convolutions of the bellows. Pivoted at its lower end on a pin 44 mounted in openings in member 41 is a round arm 45 whose upper portion extends through opening 39 and is provided with a collar to which the upper end of bellows 40 is sealingly clamped by a nut 47 cooperating with screwthreads on the arm. At its top arm 45 is machined to form a flat portion 48. Secured to the bottom of arm 45, by means of a rivet portion 49 on the arm, is a generally-flat horizontal arm 50 which carries on its free end a closure disk 51 cooperable with the valve seat 16; there being a floating connection 52, of conventional form, between arm 50 and the closure disk.

The pivoted arm 45 and closure arm 50 are biased in clockwise direction by the force of a spring 53 compressed between cap 38 and the flat top portion 48 of arm 45, rocking of arms 45, 50 in this direction being limited by the seating of closure 51. Loosely supported at its left in an opening through the top portion of arm 45 is a rod 54 which projects through stop ring 35 into the recess 34 of the plunger and has a rounded tip engageable with the bottom of the recess, the rod having intermediate its ends a collar 55 engageable with arm 45.

In the top of body 17 is a shallow recess 56 over which is a cover 57, of molded insulating material, for mounting of terminals (not shown) electrically connected to the sub-terminals 28. The hollow interior of body 17 is almost filled with a viscous liquid indicated at 58. To permit relatively unrestricted passage of this liquid between opposite ends of the plunger 33 there is an opening 59 in the head of the guide tube 30, the space at the right of the solenoid device being in communication with the space at its left by way of passages 60 (see Fig. 2) between the body portion 17′ and the solenoid device.

The parts are shown in normal position in the drawing. When alternating current is passed through coil 24 the plunger 33 is attracted leftward into engagement with the stop ring 35, bridging the air-gap 23. This movement of the plunger effects, through rod 54, counterclockwise rocking of arms 45, 50 to unseat closure 51. When the coil is deenergized, the parts return to the positions shown in the drawing under the force of spring 53.

To prevent or reduce A.C. vibration or hum of a solenoid operator it is customary to provide, as part of the magnetic frame of the solenoid, a stop engageable by the plunger when it is attracted, and to arrange a shading coil as part of either the stop or the cooperating end of the plunger; eddy currents being induced in the shading coil which currents, at the zero point of the A.C. cycle, establish magnetic flux for holding the plunger at that point of the cycle.

According to this invention, however, the use of a shading coil is avoided because of the high loss of power resulting from eddy currents of the magnitude necessary to prevent A.C. vibration of the plunger. The stop ring 35 does not function as a shading coil, and in the absence of the viscous liquid 58 the plunger, while in attracted position, vibrates into and out of engagement with the stop ring in accordance with the alternations of the current and causes a loud hum, as has been determined by actual tests.

The stop 35 may be of magnetic material or of nonmagnetic material, and when the stop is in the form of a ring, as shown, its circuit may be interrupted by a slot (not shown) to prevent establishment of significant eddy currents. The stop may even be of nonmetallic material. However, when the stop is formed and arranged as shown in the drawing it is preferably of magnetic material since, because of its proximity to the tubular frame-member 21, it then supplements the magnetic circuit of the solenoid device and increases the efficiency of the operator considerably.

The stop, when in the form of a ferrous ring arranged as shown, might offhand appear to be a shading coil since it is isolated from the main part of the magnetic frame by the thin nonmagnetic guide-tube 30. However, the resistance of the ferrous material to eddy currents is relatively high. Furthermore, the ring may be slotted, as mentioned above, to reduce eddy currents to a negligible amount without affecting the function of the ring in this invention.

When liquid of suitable viscosity is provided in the housing or reservoir formed by the interior of body 17 and the plunger is in attracted position, A.C. vibration of the plunger along its axis of operative movement is virtually eliminated because of the adhesive action of the film of liquid between the cooperating surfaces of the plunger and the stop. Such liquid allows movement of the plunger at a relatively low rate but prevents substantial movement at a high rate, i.e., prevents noticeable hum, at a high rate commensurate with the frequency of the energizing source and thus such liquid may be considered to be an element of a low-pass filter.

When the area of the cooperating surfaces of the plunger and the guide tube is relatively large and the clearance between these surfaces is small, the viscous liquid between these parts prevents radial vibration of the plunger (especially of its free inner end) into and out of engagement with the tube, which vibration would otherwise result because of inevitable unbalance of the alternating flux linking the plunger.

As is more fully described in my aforementioned application Serial No. 672,688, the adhesive action of the liquid between the plunger and the guide tube also tends to prevent axial vibration of the plunger, and retards the operative movements of the plunger. It is not essential to the present invention that the area of the cooperating surfaces of the plunger and the tube be large enough that operative movements of the plunger are retarded greatly; however, it is desirable that the arrangement be such that movement of the plunger toward the stop is retarded somewhat to reduce the noise caused by impact of the plunger against the stop. If it is desired to eliminate A.C. vibration of the plunger without appreciably retarding its operative movements, the area of the surface of the plunger cooperable with the guide tube may be reduced, as by making the plunger generally square in cross section. A solenoid plunger of that kind is shown in my Patent No. 2,098,196.

The central part of the stop-engaging end of the plunger is undercut or dished slightly, as indicated at 61, so that only a narrow margin of the end surface of the plunger is presented to the stop ring. When the viscosity of the liquid employed is high, the film of liquid between the small (because of dish 61) cooperating surface-areas of the plunger and stop is sufficient, by its adhesive action, to prevent appreciable vibration of the plunger, but does not cause excessive delay of initial movement of the plunger under the force of its bias when the solenoid is deenergized. When less viscous liquid is employed the area of these surfaces should be increased to obtain the degree of adhesive action necessary to quell the A.C. hum. The angle of the dished surface 61 is made as small as practicable (say, 5°) when the stop is of magnetic material to keep the air-gap between these parts small.

The degree of viscosity of the liquid necessary to prevent A.C. vibration of the plunger depends mainly on the area of the cooperating surfaces of the plunger and the stop; while the rate of operative movement of the plunger depends, in relation to the viscosity of the liquid, on the cooperating surface-areas of the plunger and guide tube, on the clearance space between these parts (which normally does not exceed .005–.008 inch diametrical for magnetic reasons), and on the force tending to move the plunger, which force is small when the operator is employed in connection with the operation of a domestic fuel-gas valve, for which purpose this operator has major utility because of its freedom from A.C. hum (which hum is particularly objectionable in a residence), the controllable rate of operation of the valve, and the small consumption of electrical energy.

When highly viscous liquid is employed the size of the opening 59 in the head of the plunger tube has negligible effect on the rate of operation of the plunger, since even when this opening is small it permits virtually unrestricted passage of the liquid at the slow rate of movement of the plunger permitted by the highly viscous liquid. However, in an arrangement where less-viscous liquid is employed and the cooperating surfaces of the plunger and stop are made relatively large to prevent A.C. hum, the size of the opening 59, or its equivalent, may be adjusted to determine the desired rate of movement of the plunger.

To produce a relatively compact structure according to this invention, I have found that it is necessary to employ liquid whose viscosity is high by comparison with, for example, that of ordinary lubricating oils. While liquids such as petroleum oils may be employed, those of the silicone type (such as the methyl silicone fluids) are preferred because of the small change of viscosity of these silicone liquids over a wide range of temperature. As is described in said abandoned application Serial No. 594,280 and in said continuation-in-part thereof Serial No. 672,688, the viscosity rating of the silicone fluid may be in the order of 12,500 centistokes. While the hum-eliminating feature of this invention has been described in connection with an electromagnetic operator comprising an armature in the form of a reciprocable plunger, it is apparent that viscous liquid and a stop may be employed for preventing A.C. hum in connection with armatures of other forms.

I claim as my invention:

1. In an A.C. solenoid operator of the type which comprises a guide tube; an elongated magnetic plunger reciprocable in said tube and biased toward one end thereof; a stop mounted on the other end of said tube; solenoid means around said tube for attracting said plunger toward engagement with said stop; means forming with the interior of said tube a reservoir for liquid; and liquid in said reservoir: the improvement consisting in that the viscosity of said liquid is made high enough that, because of its adhesive action, appreciable vibration of said plunger is prevented when the solenoid means is energized by alternating current; and the area of interengagement of said plunger and said stop is made substantially less than the cross sectional area of the plunger to prevent appreciable delay of movement of the plunger away from the stop, because of the adhesive action of said liquid between these parts, when the solenoid means is deenergized.

2. An A.C. solenoid operator according to claim 1 wherein the viscosity of said liquid is at least 1000 centistokes at room temperature.

3. An A.C. solenoid operator according to claim 1 wherein said stop is of nonmagnetic material.

4. An A.C. solenoid operator according to claim 1 including means for connecting said plunger to a device to be operated, said connecting means comprising a stem substantially coaxial with the plunger and connected to the plunger for rocking movement in all directions relative thereto.

5. An A.C. solenoid operator according to claim 1 wherein said stop is in the form of a thin-walled ring secured at its periphery in said other end of the tube.

6. An A.C. solenoid operator according to claim 5 wherein said plunger has an axial stem extending freely through the opening of said ring for connection to a device to be operated.

7. In an A.C. solenoid operator of the type which comprises a plunger tube; an elongated magnetic plunger reciprocable in said tube and closely guided thereby; means biasing said plunger toward one end of said tube; a stop mounted on the other end of said tube for engagement by one end of said plunger; solenoid means around said tube for attracting said plunger toward engagement with said stop, said solenoid means including a magnetic frame having a portion in good flux-conducting relation to said stop; means forming with the interior of said tube a reservoir for liquid; and liquid in said reservoir: the improvement consisting in that the viscosity of said liquid is made high enough that when the solenoid means is energized by alternating current the adhesive action of the film of said liquid between the plunger and said tube, and between said plunger-end and said stop, prevents appreciable A.C. vibration of the plunger; said improvement consisting further in that the area of interengagement of said plunger-end and said stop is made substantially less than the cross sectional area of the plunger to prevent appreciable delay of movement of the plunger away from the stop when the solenoid means is deenergized, which delay would otherwise be excessive because of the adhesive action of the viscous liquid between these parts.

8. An A.C. solenoid operator according to claim 7 wherein the viscosity of said liquid is at least 1000 centistokes at room temperature.

9. An A.C. solenoid operator according to claim 7 wherein said stop is wholly of magnetic material.

10. In an A.C. solenoid valve of the type which comprises a solenoid device having a plunger tube; an elongated magnetic plunger reciprocable in said tube and closely guided thereby; means biasing said plunger toward one end of said tube; a stop mounted on the other end of said tube for engagement by one end of said plunger; solenoid means around said tube for attracting said plunger toward engagement with said stop; means forming with the interior of said tube a reservoir for liquid; a valve outside said reservoir and having a valve closure; means, extending sealingly through a wall of said reservoir, interconnecting said closure and said plunger and arranged so that said attraction of the plunger effects opening of the valve; and liquid in said reservoir whose presence in the clearance space between the plunger and the tube effects retarded operative movements of the plunger and the closure: the improvement consisting in that the viscosity of said liquid is made high enough that when the solenoid means is energized by alternating current the adhesive action of said liquid in said clearance space, and between said plunger-end and said stop, prevents appreciable A.C. vibration of the plunger; said improvement consisting further in that the area of interengagement of said plunger-end and said stop is made substantially less than the cross sectional area of the plunger to prevent appreciable delay of movement of the plunger away from the stop, and accordant delay of closing of the valve closure, when the solenoid means is deenergized, which delay would otherwise be excessive because of the adhesive action of the viscous liquid between these parts, said improvement consisting further in that said interconnecting means incorporates means loosely interconnecting said plunger and said valve closure whereby the position of said plunger in said guide tube is substantially unaffected by the pressure and its variations on said valve closure.

11. An A.C. solenoid valve according to claim 10 wherein the viscosity of said liquid is at least 1000 centistokes at room temperature.

12. In an A.C. solenoid operator of the type which comprises a guide tube; an elongated magnetic plunger reciprocable in said tube and so fitting the tube that there is a small clearance space therebetween; means biasing said plunger toward one end of said tube; a stop mounted on the other end of said tube for engagement by one end of said plunger; solenoid means around said tube for attracting said plunger toward engagement with said stop; means forming with the interior of said tube a reservoir for liquid; and liquid in said reservoir: the improvement consisting in that the viscosity of said liquid is made high enough that when the solenoid means is energized by alternating current the adhesive action of said liquid in said clearance space between the plunger and the tube, and between said plunger-end and said stop, prevents appreciable A.C. vibration of the plunger; said improvement consisting further in the provision of a passage, independent of said clearance space, of sufficient capacity relative to said clearance space to provide such freedom of fluid communication between the opposite ends of the plunger that a dashpot effect is avoided.

13. An A.C. solenoid operator according to claim 12 wherein said passage comprises an opening extending through said stop to the reservoir.

14. An A.C. solenoid operator according to claim 12 wherein the liquid in the reservoir extends to both ends of said tube.

15. An A.C. solenoid operator according to claim 12 wherein the area of interengagement of said stop and said one plunger end is substantially less than the cross sectional area of said plunger.

16. An A.C. solenoid operator according to claim 12 wherein said guide tube is of non-magnetic material and said stop is within said tube with the wall of said tube serving to provide a high reluctance path for the flow of magnetic flux from said solenoid means to said stop, 17. An A.C. solenoid operator according to claim 12 in which said stop and said plunger interengage, in the energized condition of said solenoid means, on an annular region having an area appreciably less than the cross sectional area of said plunger.

References Cited in the file of this patent

UNITED STATES PATENTS

| | | |
|---|---|---|
| 1,166,699 | Lutz | Jan. 4, 1916 |
| 1,552,375 | Ainsworth | Sept. 1, 1925 |
| 1,721,995 | Harris | July 23, 1929 |
| 1,926,480 | Foale | Sept. 12, 1933 |
| 2,291,599 | Ray | Aug. 4, 1942 |
| 2,388,990 | Nelson | Nov. 13, 1945 |
| 2,622,622 | Ray | Dec. 23, 1952 |
| 2,735,047 | Garner | Feb. 14, 1956 |
| 2,810,067 | Fowler | Oct. 15, 1957 |

FOREIGN PATENTS

| | | |
|---|---|---|
| 546,817 | France | Sept. 4, 1922 |